US009262735B2

(12) United States Patent
Nakamura et al.

(10) Patent No.: US 9,262,735 B2
(45) Date of Patent: Feb. 16, 2016

(54) IDENTIFYING AND AMALGAMATING CONDITIONAL ACTIONS IN BUSINESS PROCESSES

(71) Applicant: INTERNATIONAL BUSINESS MACHINES CORPORATION, Armonk, NY (US)

(72) Inventors: Taiga Nakamura, Santa Clara, CA (US); Hironori Takeuchi, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/964,815

(22) Filed: Aug. 12, 2013

(65) Prior Publication Data

US 2015/0046150 A1  Feb. 12, 2015

(51) Int. Cl.
| | | |
|---|---|---|
| *G06F 17/20* | (2006.01) | |
| *G06F 17/21* | (2006.01) | |
| *G06F 17/27* | (2006.01) | |
| *G06Q 10/06* | (2012.01) | |
| *G06F 17/22* | (2006.01) | |

(52) U.S. Cl.
CPC ...... *G06Q 10/06316* (2013.01); *G06F 17/2211* (2013.01); *G06F 17/271* (2013.01)

(58) Field of Classification Search
CPC ............................................ G06F 17/02
USPC ...................... 704/1, 9, 10, 257, 270–275
See application file for complete search history.

(56) References Cited

U.S. PATENT DOCUMENTS

| | | | |
|---|---|---|---|
| 7,752,608 B1 * | 7/2010 | Hinchey et al. | 717/136 |
| 2005/0278139 A1 * | 12/2005 | Glaenzer et al. | 702/179 |
| 2007/0055491 A1 * | 3/2007 | Manson et al. | 704/9 |
| 2010/0325491 A1 * | 12/2010 | Kumanan et al. | 714/38 |

FOREIGN PATENT DOCUMENTS

| | | |
|---|---|---|
| JP | 09-245037 | 9/1997 |
| JP | 10-177575 | 6/1998 |
| JP | 2000-112949 | 4/2000 |
| JP | 2005-025257 | 1/2005 |
| JP | 2005-190185 | 7/2005 |
| JP | 2008-225561 | 9/2008 |
| JP | 2009-140048 | 6/2009 |
| JP | 2011-165087 | 8/2011 |

* cited by examiner

*Primary Examiner* — Jesse Pullias
(74) *Attorney, Agent, or Firm* — Tutunjian & Bitetto, P.C.; Vazken Alexanian

(57) ABSTRACT

Methods and systems for identifying conditional actions in a business process are disclosed. In accordance with one such method, text fragments are extracted from input documents. In addition, a plurality of pairs of the text fragments that respectively include text fragments that are similar according to a pre-defined similarity standard are determined. For each pair of at least a subset of the pairs, at least one difference between the text fragments of the corresponding pair is determined. Further, at least two particular pairs of the subset of the pairs are merged in response to determining that the particular pairs have at least one of the determined differences in common. Additionally, the merged particular pairs are output to indicate the conditional actions in the business process.

20 Claims, 5 Drawing Sheets

IDENTIFYING AND AMALGAMATING CONDITIONAL ACTIONS IN BUSINESS PROCESSES

BACKGROUND

1. Technical Field

The present invention relates to analyzing business processes, and more particularly, to systems, devices and methods for compiling and conveying behaviors and associated conditions of business processes.

2. Description of the Related Art

When automating a business process, building a business process model or changing an existing automated system or business model, a substantially comprehensive understanding of the business process or the behavior of the system is needed. Typically, this understanding is achieved manually by reading specifications, reading business manuals and creating business flow diagrams. Further, knowledge of behaviors in the business process as well as conditions leading to those behaviors and variations of the behaviors should be acquired to generate accurate business flow diagrams.

Extensive knowledge of business process behaviors and associated conditions is also needed when creating test cases for a developed business process system or model. Here, test cases are generally created from specifications and manuals of the business. For enhanced testing, complicated portions of the business process in which many conditions are considered in the system or model should be tested. Thus, to enable enhanced testing, such complicated portions need to be identified from the documents and compiled in a facilitative manner.

In general, for each actor in a business process, his or her actions or behaviors can be described in a multitude of different documents. Thus, when they are identified manually, there is a relatively high risk that some important descriptions may be overlooked. If search engines and systems are used to collect this information, then the function or action descriptors need to be known in advance for insertion into the query. However, comprehensive search queries can lead to a retrieval of a very large number of descriptions as results, leading to tedious and time consuming review of these results to identify relevant descriptions and determine the complex conditional behaviors of a business process.

SUMMARY

One embodiment is directed to a method for identifying conditional actions in a business process. In accordance with the method, text fragments are extracted from input documents. In addition, a plurality of pairs of the text fragments that respectively include text fragments that are similar according to a pre-defined similarity standard are determined. For each pair of at least a subset of the pairs, at least one difference between the text fragments of the corresponding pair is determined. Further, at least two particular pairs of the subset of the pairs are merged in response to determining that the particular pairs have at least one of the determined differences in common. Additionally, the merged particular pairs are output to indicate the conditional actions in the business process.

Another embodiment is directed to a non-transitory computer readable medium comprising a computer readable program for identifying conditional actions in a business process. The computer readable program, when executed on a computer, causes the computer to perform a method including: extracting text fragments from input documents; determining a plurality of pairs of the text fragments that respectively include text fragments that are similar according to a pre-defined similarity standard; for each pair of at least a subset of the pairs, determining at least one difference between the text fragments of the corresponding pair; merging at least two particular pairs of the subset of the pairs in response to determining that the particular pairs have at least one of the determined differences in common; and outputting the merged particular pairs to indicate the conditional actions in the business process.

Another embodiment is directed to a system for identifying conditional actions in a business process. The system includes an analyzer, a fragment pair extractor, an evaluation module and a merging module. The analyzer is configured to extract text fragments from input documents. In addition, the fragment pair extractor is configured to determine a plurality of pairs of the text fragments that respectively include text fragments that are similar according to a pre-defined similarity standard. Further, the evaluation module is configured to determine, for each pair of at least a subset of the pairs, at least one difference between the text fragments of the corresponding pair. Additionally, the merging module is configured to merge at least two particular pairs of the subset of pairs in response to determining that the particular pairs have at least one text fragment in common and have at least one of the determined differences in common. The merging module is also configured to output the merged particular pairs to indicate the conditional actions in the business process.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
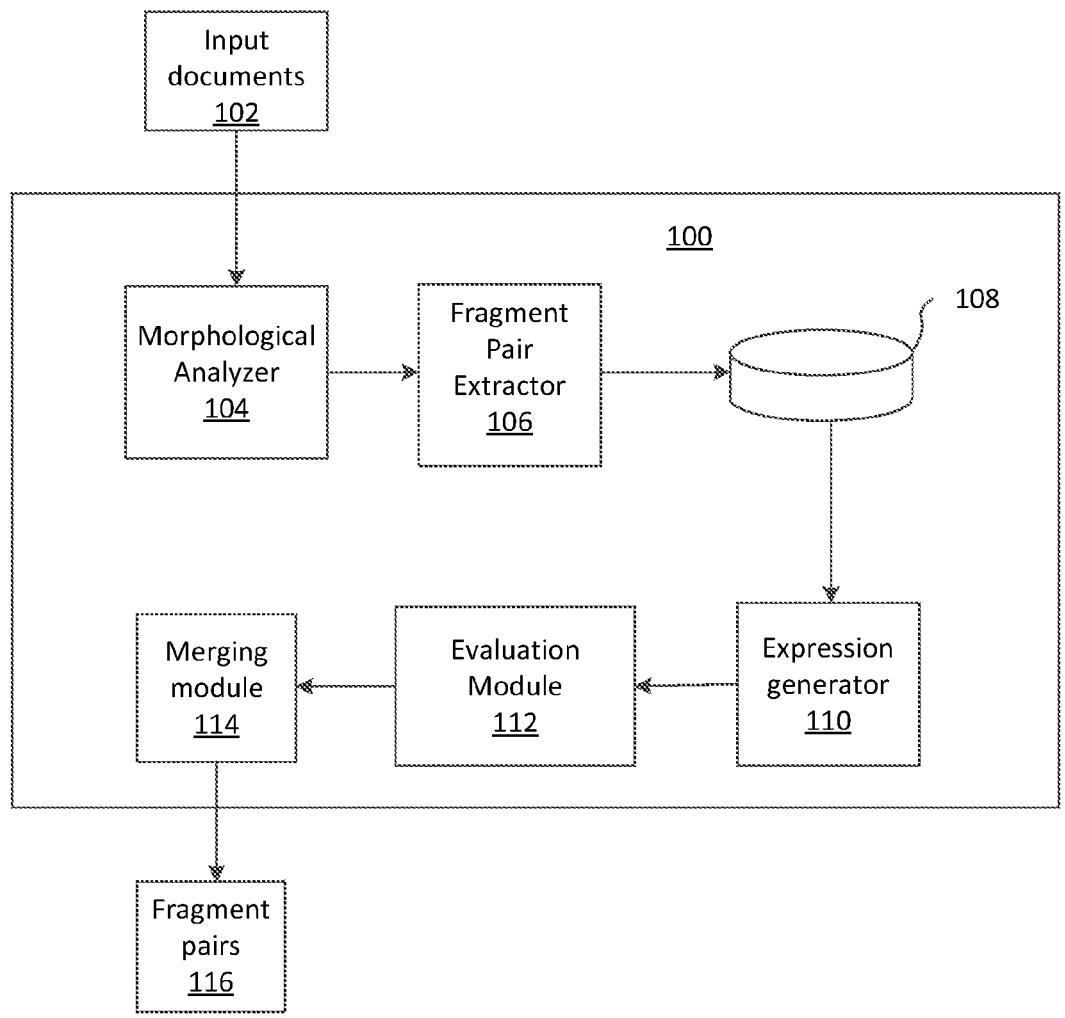
FIG. 1 is a high-level block/flow diagram of a system for identifying conditional actions in a business process and the conditions under which actions occur in a business process in accordance with an exemplary embodiment of the present invention.

Exemplary embodiments of the present invention provide a means for identifying conditional actions in a business process. In particular, the embodiments extract text fragments from input documents describing a business process, such as, for example, specification documents and business manual documents, and form associations between fragments to enable a user to deduce conditional actions and actors of portions of a business process. One important feature of preferred embodiments of the present invention is that, to form associations between text fragments, the text fragments are not only evaluated for similarity but also for common differences with other text fragments. Associating fragments in this way has a substantial advantage in that it provides a highly targeted means for filtering documents describing a business process. For example, it can be shown that, in comparison to an existing method for finding fragments denoting conditional actions in a business process, the preferred embodiments of the present invention reduce the amount of fragments that are reviewed by a user by ⅔ to convey the same information. Thus, the preferred embodiments can substantially facilitate and expedite a user's acquisition of knowledge about a business process to enable the user to construct or modify a business model or design or modify an automated business process system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, illustrating an exemplary system 100 for identifying conditional actions in a business process and the conditions under which actions occur in a business process. As indicated above, such information is useful in generating or modifying a business model or in designing or modifying an automated business process system. The system 100 includes a morphological analyzer 104, a fragment pair extractor 106, a fragment pair repository 108, an expression generator 110, an evaluation module 112 and a merging module 114. Preferred embodiments of the present invention are configured to receive and analyze input documents 102 that have particular properties for purposes of discovering and compiling information on conditional actions of a business process. Specifically, the preferred embodiments assume that the behaviors of users and systems are described in the documents, that the same verbs and nouns are used to represent the same actions or objects and that the same sentence syntax and writing style is used throughout the documents (for example, the same word order is used when describing similar things). Further, in accordance with one exemplary aspect, the system and method extract pairs of descriptions in which only expressions representing behavior, status or existence are considered. The output 116 of the system and method are pairs of descriptions and specifications of differences in the descriptions.

Figure 2:
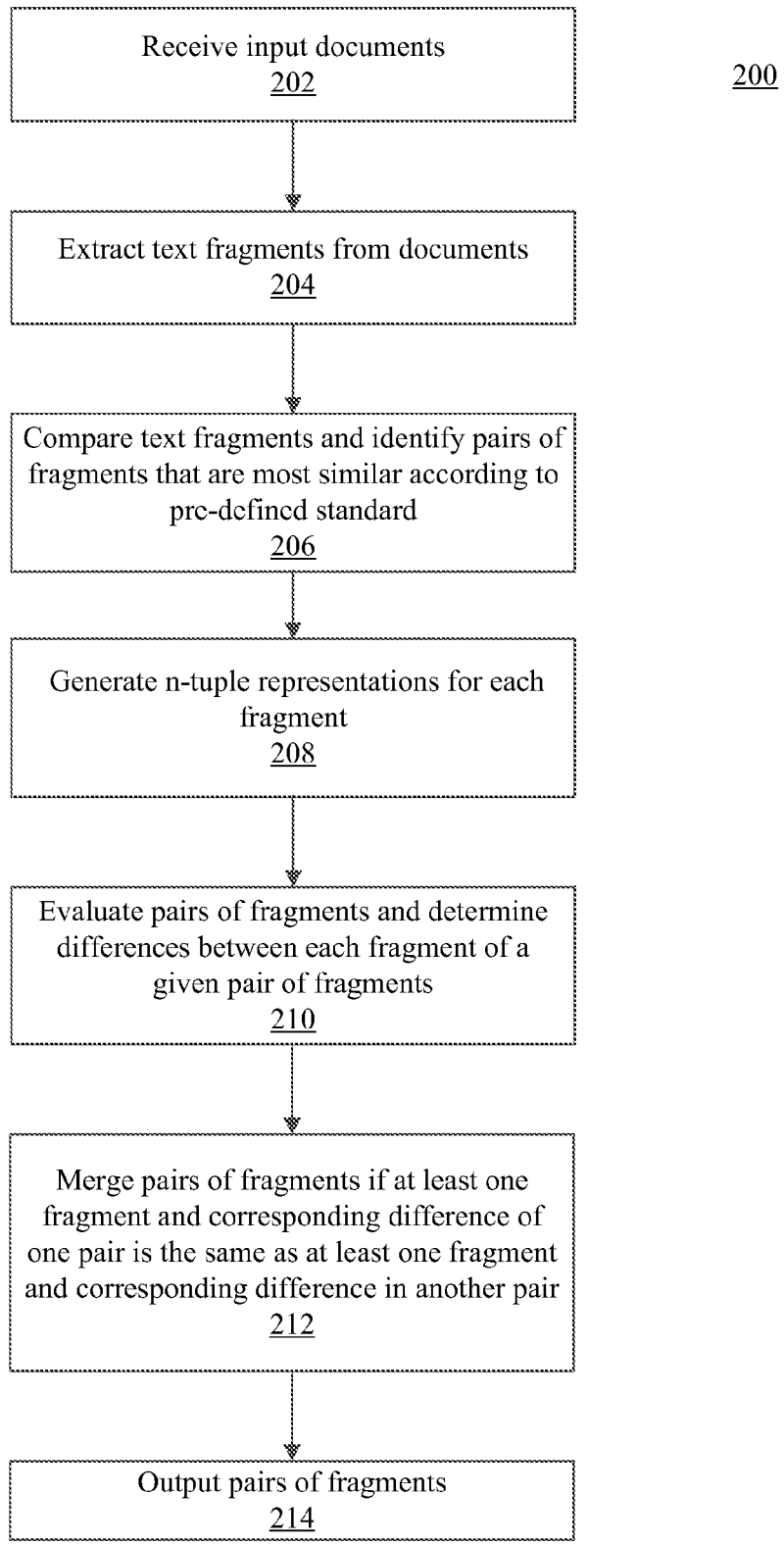
FIG. 2 is a high-level flow diagram of a method for identifying conditional actions in a business process and conditions under which actions occur in a business process in accordance with an exemplary embodiment of the present invention.

To better describe the functions of the various elements of the system 100, reference is made to the method 200, which is illustratively depicted in FIG. 2 and which can be performed by the system 100. The method 200 is a method for identifying conditional actions in a business process and conditions under which actions occur in a business process. The method 200 can begin at step 202, in which the system 100 can receive input documents 102. Here, the input documents 102 can include specification documents and business manual documents.

At step 204, the morphological analyzer 104 can extract text fragments from the documents 102. For example, a text fragment can be a sentence or a description in table cells, for example a noun phrase. Thus, from the input documents 102, the morphological analyzer 104 can automatically extract text fragments, including sentences and/or table cell descriptions.

At step 206, the fragment pair extractor 106 can compare text fragments and identify pairs of fragments that are most similar according to a predefined standard. For example, the fragment pair extractor 106 can compile different combinations of pairs of the fragments provided by the morphological analyzer 104. For each pair of text fragments, the fragment pair extractor 106 can calculate a similarity score (Sim), where, in a preferred embodiment, $0 \leq Sim \leq 1$. Here, when Sim=1, the two text fragments are the same. In addition, the fragment pair extractor 106 can apply a cosine measure or a string edit distance to the fragments in a pair to thereby calculate Sim. The string edit distance can be calculated as a levenshtein distance or a normalized levenshtein distance, which measure the similarity between two sequences. In one embodiment, a user can set a threshold "t", where the fragment pair extractor 106 extracts pairs $\{si1, si2\}$ (i=1, 2, . . . , n) as most similar text fragments when Sim for a given pair si1 and si2 is greater than the threshold t. The fragment pair extractor 106 can store the extracted pairs of fragments in the repository 108. Examples of pairs of text fragments that can be extracted by the fragment pair extractor 106 are provided herein below in Table 1.

TABLE 1

Examples of Pairs of Text Fragments s11: AAA decides there is a reasonable assurance issue affecting the year.
s12: AAA decides there is not a reasonable assurance issue affecting the year.
s21: MIL-STD-1397A
s22: MIL-STD 6016A
s31: AAA decides that the ordered items are available to request.
s32: AAA decides that the ordered items are not available to request.
s41: ISO/IEC JTC1 8326 AD 2: Connection-Oriented Session Service
s42: ISO/IEC JTC1 8327 AD 2: Connection-Oriented Session Protocol
s51: Message Transfer Services shall provide a mechanism for viewing messages that have been logged.
s52: Message Transfer Services shall provide a mechanism for editing messages that have been logged.

At step 208, the expression generator 110 generates n-tuple representations for each fragment. For example, in a preferred embodiment, n=3. Here, from each extracted pair of fragments $\{si1, si2\}$, various expressions can be generated and can be employed for the fragments in each of the pairs $\{sit, si2\}$. For example, the expression generator 110 can identify a fragment as including a behavior fragment in response to determining that the fragment is of the following format: Noun phrase (or Null)+verb phrase+noun phrase. For a behavior fragment, the expression generator 110 stores the 3-tuple expression N1-V-N2 for the behavior text fragment, for example in the pair $\{si1, si2\}$, wherein N1 is the first known phrase in the fragment, V is the verb phrase in the fragment and N2 is the second noun phrase in the fragment. Here the verb phrase is any verb other than a variation of the "to be" verb.

For example, an expression representing behavior can be extracted from the following sentence: "The system provides a mechanism for viewing messages" Here, N1 is "system," V is "provide" and N2 is "mechanism" for the behavior expression. In addition, the sentence includes another behavior expression, where the expression is denoted by Null for N1, "view" for V and "message" for N2.

Also at step 208, the expression generator 110 can identify a fragment as including a status fragment in response to determining that the fragment is of the following format: Noun phrase (or Null)+"to be" verb phrase+(noun phrase or adjective phrase). For a status fragment, the expression generator 110 stores the 3-tuple expression N1-V-N2 for the status text fragment, for example in the pair {si1, si2}, wherein N1 is the first known phrase in the fragment, V is the "to be" verb phrase in the fragment and N2 is the second noun phrase or adjective phrase in the fragment. The verb phrase can be variations of the verb "to be," such as was, was not, were, were not, is, is not, are, are not.

For example, an expression representing status can be extracted from the following sentence: "The message code is 10." Here, N1 is "message code," the "to be" V is "be" and N2 is "10" for the status expression. In addition, another sentence from which an expression representing status can be extracted is "The log data is available," where N1 is "log," the "to be" V is "be" and N2 is "available" for the status expression.

Further, also at step 208, the expression generator 110 can identify a fragment as including an existence fragment in response to determining that the fragment is of the following format pronoun phrase+"to be" verb phrase+noun phrase. Preferably, the expression generator 110 can identify a fragment as including an existence fragment in response to determining that the fragment is of the following format: "There"+"to be" verb phrase+noun phrase. For an existence fragment, the expression generator 110 stores the 3-tuple expression P-V-N2 for the status text fragment, for example in the pair {si1, si2}, wherein P is the pronoun phrase, preferably limited to "there," in the fragment, V is the "to be" verb phrase in the fragment and N2 is the second noun phrase or adjective phrase in the fragment. As noted above, the "to be" verb phrase can be variations of the verb "to be," such as was, was not, were, were not, is, is not, are, are not.

For example, an expression representing existence can be extracted from the following sentence: "There is an order request." Here, P is "there," the "to be" V is "be" and N2 is "request" for the existence expression.

At step 210, the evaluation module 112 can evaluate pairs of fragments and determine differences between each fragment of a given pair of fragments. For example, in accordance with a preferred embodiment, the evaluation module 112 can determine that pairs of fragments for behavior fragments and/or status fragments of a given pair have differences only if the evaluation module 112 determines that one of the following two conditions are met for a given pair {si1, si2}: Condition A—N1 of si1 and N1 of si2 are the same and N2 of si1, and N2 of si2 are the same, but V of si1 is different from V of si2; or Condition B—N1 of si1 and N1 of si2 are the same, and V of si1 is the same as V of si2, but N2 of si1 is different from N2 of si2. Here, if the evaluation module 112 determines that one or both of the conditions A and B are satisfied for a given pair {si1, si2}, then the evaluation module 112 outputs {si1, si2} with difference {di1, di2} as text fragments in which behavior, status and/or existence expressions are different. In particular, the evaluation module 112 can output PDi={si1, si2, di1, di2}. The primary purpose of determining the differences at step 210 is to find candidates that may be suitable for merger at step 212. If the evaluation module 112 determines that one of the two conditions A or B for a given pair {si1, si2} are not satisfied, then the evaluation module 112 filters out {si1, si2} without merging the pair with another pair and, in preferred embodiments, without outputting {si1, si2}. However, in other embodiments, the evaluation module 112 and the system 100 can output each of the pairs, both merged and non-merged pairs, at step 214, described in more detail herein below By way of example, the following two 3-tuple representations of fragments illustrate a pair of fragments that satisfy condition A: di1=(system, receive, error message) and di2=(system, send, error message), where N1 and N2 are the same, but V is different for the two fragments. As another example, the following two 3-tuple representations of fragments illustrate a pair of fragments that satisfy condition A: di1=(null, start, service) and di2=(null, stop, service), where N1 and N2 are the same, but V is different for the two fragments. In turn, the following two 3-tuple representations of fragments illustrate a pair of fragments that satisfy condition B: di1=(file, be, readable) and di2=(file, be, executable), where N1 and V are the same, but N2 is different for the two fragments. Table 2 below illustrates other examples of fragments and their 3-tuple representations that satisfy conditions A or B.

It should be noted that conditions A or B are similar for existence statements, where the evaluation module 112 can determine that pairs of fragments for existence fragments of a given pair have differences only if the evaluation module 112 determines that one of the following two conditions are met for a given pair {si1, si2}: Condition A—P of si1 and P of si2 are the same, and N2 of si1 and N2 of si2 are the same, but V of si1 is different from V of si2; or Condition B—P of si1 and P of si2 are the same, and V of si1 is the same as V of si2, but N2 of si1 is different from N2 of si2. As noted above, if the evaluation module 112 determines that one or both of the conditions A and B are satisfied for a given pair {si1, si2}, then the evaluation module 112 outputs {si1, si2} with difference {di1, di2}. Specifically, the evaluation module 112 can output PDi={si1, si2, di1, di2}.

TABLE 2

Examples of Pairs
Expressions and Indications of Differences

PD1= (s1, s12,
   d11: there . . . be . . . reasonable assurance issue,
   d12: there . . . be no . . . reasonable assurance issue)
PD3= (s31, s32,
   d31: ordered item . . . be . . . available,
   d32: ordered item . . . be not . . . available )
PD5= (s51, s52, d51: view . . . message, d52: edit . . . message)

Figure 3:
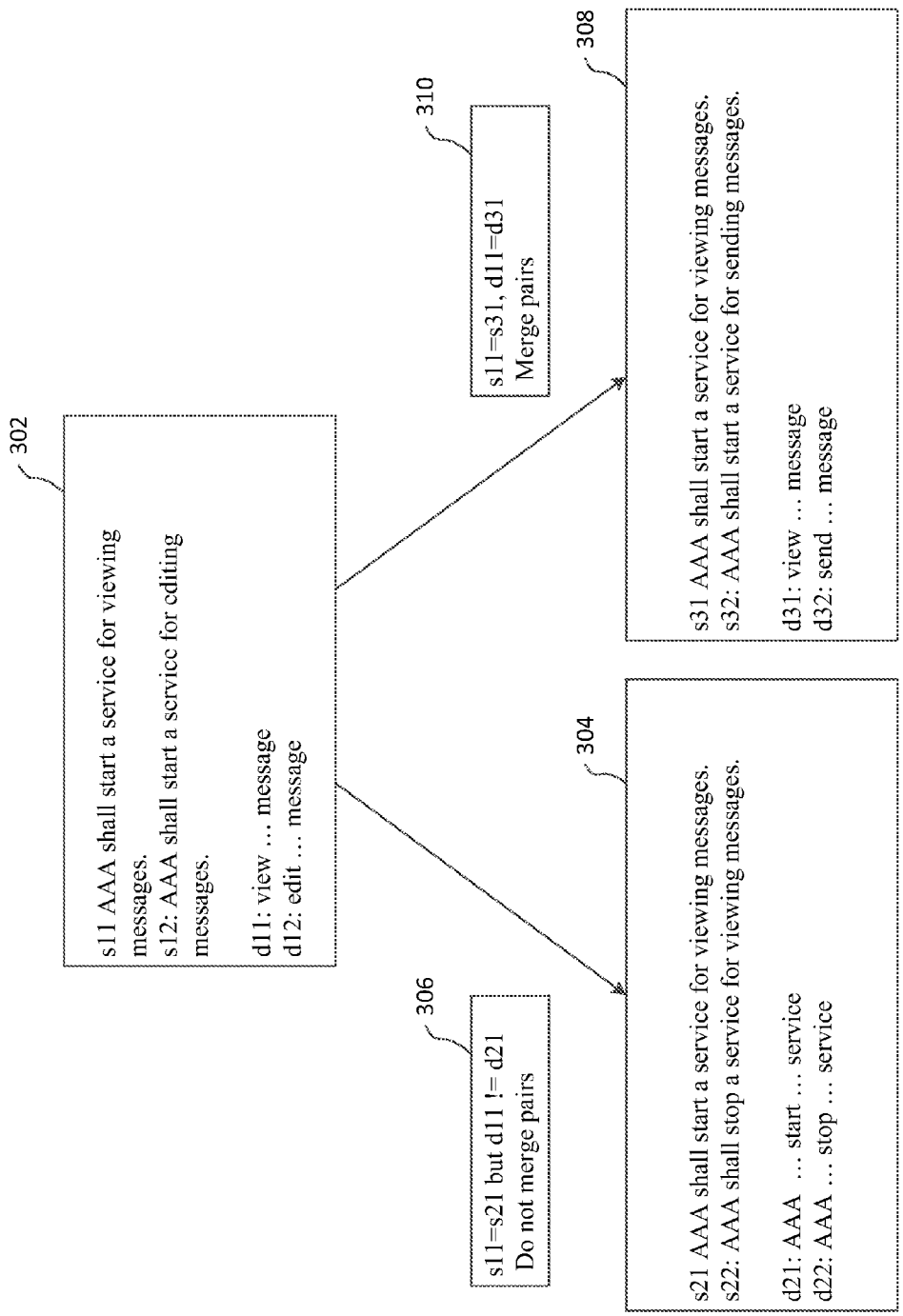
FIG. 3 is a high-level block diagram illustrating examples demonstrating merging decisions that can be made by a merging module in accordance with an exemplary embodiment of the present invention.

At step 212, the merging module 114 can merge pairs of fragments if a fragment and corresponding difference of one pair is the same as a fragment and corresponding difference of another pair. For example, the merging module 114 can compare PDi and PDj and can merge the pairs {si1, si2} and {sj1, sj2}, or can merge {si1, si2, di1, di2} and {sj1, sj2, dj1, dj2}, in response to determining that the following condition is satisfied: the pairs have at least one fragment in common and the pairs have at least one difference in common. For example, the merging module 114 can merge fragments if at least one of the following conditions are satisfied: a) si1=sj1 and di1=dj1; b) si2=sj2 and di2=dj2; c) si1=sj2 and di1=dj2; or d) si2=sj1 and di2=dj1. FIG. 3 illustrates an example in which the merging module 114 would merge statements and also an example in which the merging module 114 would not merge statements. For example, block 302 includes a pair of statements: s11 and s12, where PD1 for this pair is {AAA shall start a service for viewing messages; AAA shall start a service for editing messages; null, view, message; null, edit, message}. In addition, block 304 includes a pair of statements s21 and s22, where PD2 for this pair is {AAA shall start a service for viewing messages; AAA shall stop a service for viewing messages; AAA, start, service; AAA, stop, service}. Further, block 308 includes a pair of statements s31 and s32, where PD3 for this pair is {AAA shall start a service for viewing messages; AAA shall start a service for sending messages; null, view, message; null, send, message}. Thus, here, at block 306, the merging module 114 would determine that the pairs of blocks 302 and 304 will not be merged because, although s11=s21, d11≠d21. In turn, at block 310, the merging module 114 would merge the pairs of blocks 302 and 308 because the merging module 114 would determine that s11=s31 and d11=d31. It should be noted that, in accordance with one exemplary aspect, the merging module 114 can merge several pairs at step 212. For example, if the merging module merges two pairs and determines that one of the two pairs satisfies the merging condition with a third pair, the third pair can be merged with the two pairs. Thus, several pairs can be iteratively merged in this way.

Figure 4:
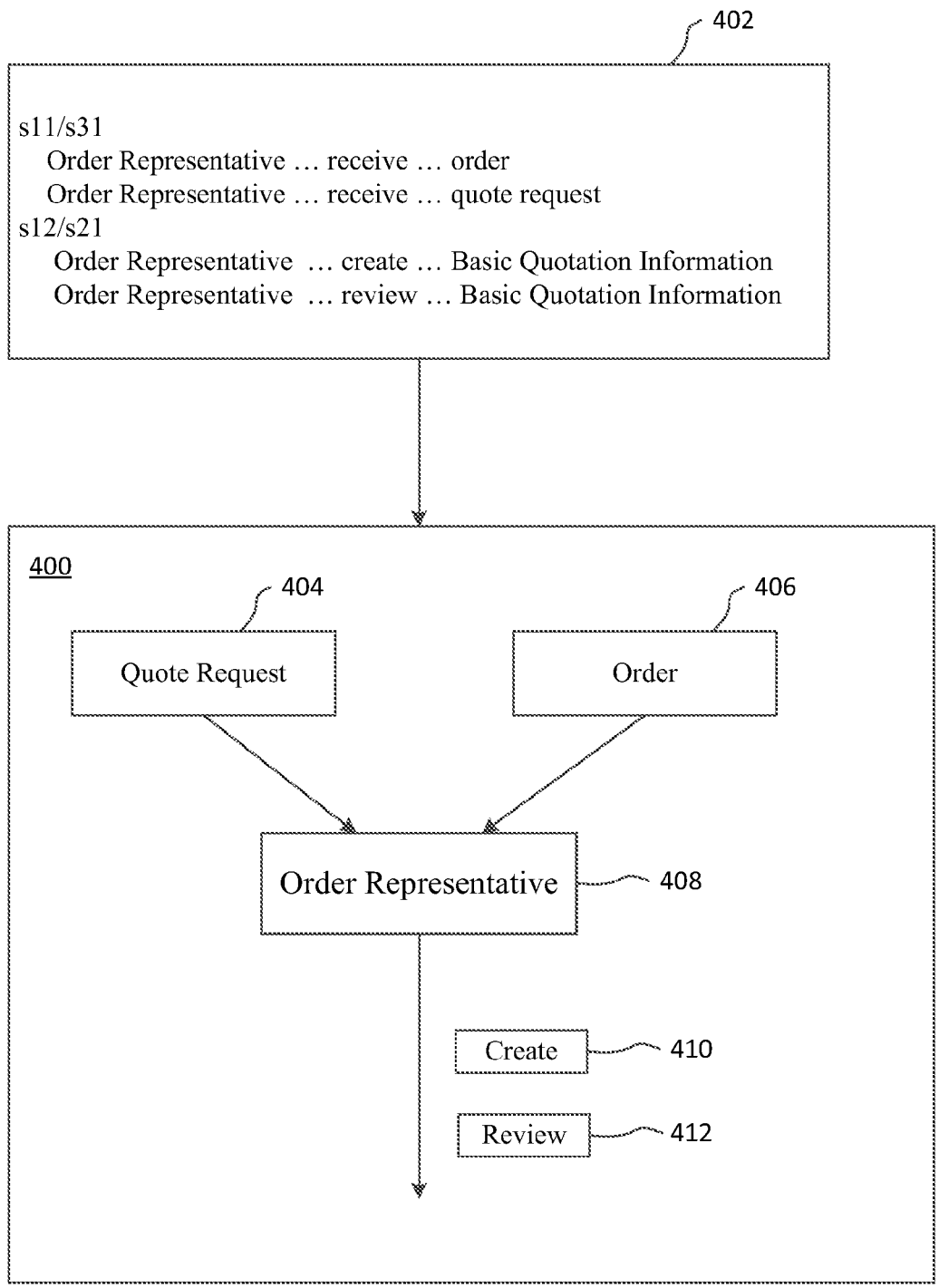
FIG. 4 illustrates an example of a flow diagram that can be created based on merged pairs of text fragments determined in accordance with an exemplary embodiment of the present invention.

At step 214, the merging module 114 can output the merged fragments to indicate conditional actions of a business process. Here, the merging module can output the pairs of fragments for storage and/or presentation to a user. Using the merged pairs, the system can visually associate conditions and actions of a business process to enable a user to construct or modify a business model or design or modify an automated business process system. For example, as illustrated in FIG. 4, statement pairs s11/s31 and s12/s21 can be merged and their corresponding differences d11/d31=(Order Representative, receive, order; Order Representative, receive, quote request) and d12/d21=(Order Representative, create, Basic Quotation Information; Order Representative, review, Basic Quotation Information) can be displayed, as shown in block 402. Based on the merged pairs, the user can easily deduce conditional actions in the business process and can construct the flow diagram 400. For example, without having to tediously peruse the input documents 102, a user can determine, based on the merged pairs 402, that, in response to receiving a quote request or an order, an order representative would then create basic quotation information 410 and review the basic quotation information at block 412.

Figure 5:
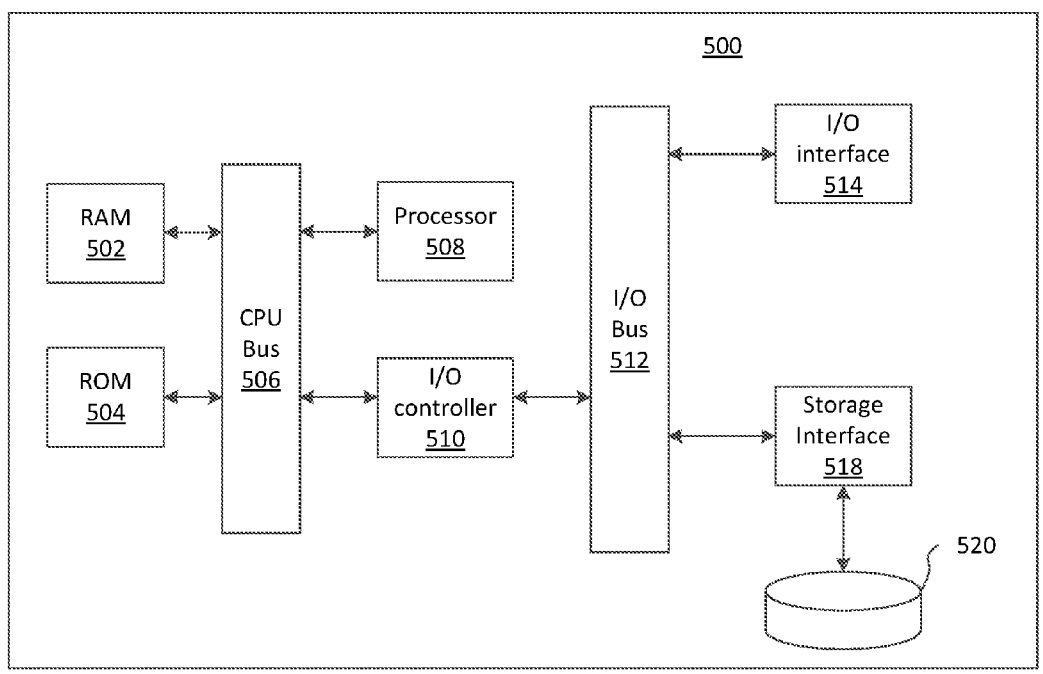
FIG. 5 is a high-level block diagram of a computing system by which exemplary method and system embodiments of the present invention can be implemented.

Referring now to FIG. 5, an exemplary computing system 500 in which system embodiments of the present invention described above can be implemented, and by which method embodiments of the present invention described above can be implemented, is illustrated. The computing system 500 includes a hardware processor 508 that can access random access memory 502 and read only memory 504 through a central processing unit bus 506. In addition, the processor 508 can also access a storage medium 520 through an input/output controller 510, an input/output bus 512 and a storage interface 518, as illustrated in FIG. 5. The system 500 can also include an input/output interface 514, which can be coupled to a display device, keyboard, mouse, touch screen, external drives or storage mediums, one or more external networks, etc., for the input and output of data to and from the system 500. In accordance with one exemplary embodiment, the processor 508 can access software instructions stored in the storage medium 520 and can access memories 502 and 504 to run the software and thereby implement the method 200 described above. In addition, the hardware processor 508 can, for example by executing software instructions stored on the storage medium 520, implement the system 100 and/or individual system elements described above, such as the analyzer 104, the fragment pair extractor 106, the expression generator 110, the evaluation module 112 and/or the merging module 114. Alternatively, each of these system elements can be implemented via a plurality of respective processors 508 in one computer system or in a plurality of different computer systems on a network. Further, the input documents 102, the fragment pairs 116 and any of the other outputs of the systems elements of FIG. 1 can be stored in the storage medium 520, which can, for example, store the repository 108. Additionally, the input/output interface 514 can be employed to output the fragment pairs 116. Alternatively or additionally, the fragment pairs 116 can be stored in the storage medium 520 for subsequent retrieval.

Having described preferred embodiments of a system and method for identifying and amalgamating conditional actions in a business process (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for identifying conditional actions in a business process comprising:
    extracting text fragments from input documents;
    determining a plurality of pairs of the text fragments that respectively include text fragments that are similar according to a pre-defined similarity standard;
    for each pair of at least a subset of the pairs, determining at least one difference between the text fragments of the corresponding pair;
    merging, by at least one hardware processor, at least two particular pairs of the subset of the pairs in response to determining that the particular pairs have at least one of the determined differences in common; and
    outputting the merged particular pairs to indicate the conditional actions in the business process;
    wherein, using the merged particular pairs, conditions and actions of the business process are visually associated to enable a user to construct or modify a business model or design or modify an automated business process.

2. The method of claim 1, wherein the merging comprises merging the at least two particular pairs in response to determining that the particular pairs have at least one text fragment in common.

3. The method of claim 1, further comprising:
    generating an n-tuple representation of each text fragment of the at least a subset of the pairs.

4. The method of claim 3, wherein then-tuple representation includes a first noun, a verb and a second noun for behavior text fragments and for status text fragments.

5. The method of claim 4, wherein the determining at least one difference comprises determining that the text fragments in the corresponding pair have the same first nouns, determining that the text fragments in the corresponding pair have the same second nouns, and determining that the text fragments in the corresponding pair have different verbs.

6. The method of claim 4, wherein the determining at least one difference comprises determining that the text fragments in the corresponding pair have the same first nouns, determining that the text fragments in the corresponding pair have the same verbs, and determining that the text fragments in the corresponding pair have different second nouns.

7. The method of claim 3, wherein then-tuple representation includes a pronoun, a verb and a noun for existence text fragments.

8. A non-transitory computer readable medium comprising a computer readable program for identifying conditional actions in a business process, wherein the computer readable program when executed on a computer causes the computer to perform a method comprising:
  extracting text fragments from input documents;
  determining a plurality of pairs of the text fragments that respectively include text fragments that are similar according to a pre-defined similarity standard;
  for each pair of at least a subset of the pairs, determining at least one difference between the text fragments of the corresponding pair;
  merging at least two particular pairs of the subset of the pairs in response to determining that the particular pairs have at least one of the determined differences in common; and
  outputting the merged particular pairs to indicate the conditional actions in the business process;
  wherein, using the merged particular pairs, conditions and actions of the business process are visually associated to enable a user to construct or modify a business model or design or modify an automated business process.

9. The non-transitory computer readable medium of claim 8, wherein the merging comprises merging the at least two particular pairs in response to determining that the particular pairs have at least one text fragment in common.

10. The non-transitory computer readable medium of claim 9, wherein the method further comprises:
  generating an n-tuple representation of each text fragment of the at least a subset of the pairs.

11. The non-transitory computer readable medium of claim 10, wherein the n-tuple representation includes a first noun, a verb and a second noun for behavior text fragments and for status text fragments.

12. The non-transitory computer readable medium of claim 11, wherein the determining at least one difference comprises determining that the text fragments in the corresponding pair have the same first nouns, determining that the text fragments in the corresponding pair have the same second nouns, and determining that the text fragments in the corresponding pair have different verbs.

13. The non-transitory computer readable medium of claim 11, wherein the determining at least one difference comprises determining that the text fragments in the corresponding pair have the same first nouns, determining that the text fragments in the corresponding pair have the same verbs, and determining that the text fragments in the corresponding pair have different second nouns.

14. The non-transitory computer readable medium of claim 10, wherein the n-tuple representation includes a pronoun, a verb and a noun for existence text fragments.

15. A system for identifying conditional actions in a business process comprising:
  an analyzer configured to extract text fragments from input documents;
  a fragment pair extractor configured to determine a plurality of pairs of the text fragments that respectively include text fragments that are similar according to a predefined similarity standard;
  an evaluation module configured to determine, for each pair of at least a subset of the pairs, at least one difference between the text fragments of the corresponding pair; and
  a merging module, implemented by at least one hardware processor, configured to merge at least two particular pairs of the subset of pairs in response to determining that the particular pairs have at least one text fragment in common and have at least one of the determined differences in common, and configured to output the merged particular pairs to indicate the conditional actions in the business process;
  wherein, using the merged particular pairs, conditions and actions of the business process are visually associated to enable a user to construct or modify a business model or design or modify an automated business process.

16. The system of claim 15, further comprising:
  an expression generator configured to generate an n-tuple representation of each text fragment of the at least a subset of the pairs.

17. The system of claim 16, wherein the n-tuple representation includes a first noun, a verb and a second noun for behavior text fragments and for status text fragments.

18. The system of claim 17, wherein the evaluation module is further configured to determine the at least one difference between the text fragments of the corresponding pair by determining that the text fragments in the corresponding pair have the same first nouns, determining that the text fragments in the corresponding pair have the same second nouns, and determining that the text fragments in the corresponding pair have different verbs.

19. The system of claim 17, wherein the evaluation module is further configured to determine the at least one difference between the text fragments of the corresponding pair by determining that the text fragments in the corresponding pair have the same first nouns, determining that the text fragments in the corresponding pair have the same verbs, and determining that the text fragments in the corresponding pair have different second nouns.

20. The system of claim 16, wherein then-tuple representation includes a pronoun, a verb and a noun for existence text fragments.

* * * * *